US011338809B2

(12) United States Patent
Tokura et al.

(10) Patent No.: US 11,338,809 B2
(45) Date of Patent: May 24, 2022

(54) VEHICLE CONTROL APPARATUS, DRIVING SUPPORT APPARATUS, AND CONTROL APPARATUS OF INFRASTRUCTURE

(71) Applicant: TOYOTA JIDOSHA KABUSHIKI KAISHA, Toyota (JP)

(72) Inventors: Takaaki Tokura, Nagoya (JP); Katsumi Kono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 16/579,996

(22) Filed: Sep. 24, 2019

(65) Prior Publication Data
US 2020/0122726 A1    Apr. 23, 2020

(30) Foreign Application Priority Data
Oct. 19, 2018 (JP) .............................. JP2018-197726

(51) Int. Cl.
  *B60W 30/18*   (2012.01)
  *G07C 5/00*    (2006.01)
  *B60W 50/00*   (2006.01)

(52) U.S. Cl.
  CPC ....... *B60W 30/18009* (2013.01); *G07C 5/008* (2013.01); *B60W 2050/0064* (2013.01); *B60W 2050/0075* (2013.01); *B60W 2556/65* (2020.02)

(58) Field of Classification Search
  CPC ....... B60W 30/18009; B60W 2556/65; B60W 50/00; B60W 2050/0075; B60W 2050/0064; G07C 5/008; G07B 15/063; G08G 1/012; G08G 1/0145; G08G 1/017; G05D 2201/0213; G05D 1/0297; B60L 53/12; B60L 53/10; Y02T 90/14; Y02T 10/7072; Y02T 10/70; H04W 4/90; H04W 4/46; H04W 4/024; H04W 4/44
  See application file for complete search history.

(56) References Cited

U.S. PATENT DOCUMENTS

| | | | | |
|---|---|---|---|---|
| 10,930,159 | B1* | 2/2021 | Jessen | ....................... G08G 1/20 |
| 2010/0106567 | A1* | 4/2010 | McNew | ................. G06Q 30/04 |
| | | | | 705/13 |
| 2014/0316865 | A1* | 10/2014 | Okamoto | ............. G05D 1/0293 |
| | | | | 705/14.1 |
| 2015/0210178 | A1* | 7/2015 | Niizuma | ................. H02J 50/90 |
| | | | | 307/9.1 |
| 2016/0036917 | A1 | 2/2016 | Koravadi et al. | |

FOREIGN PATENT DOCUMENTS

| | | |
|---|---|---|
| JP | 2015-022423 A | 2/2015 |
| WO | 2010/098554 A2 | 9/2010 |

\* cited by examiner

*Primary Examiner* — Hunter B Lonsberry
*Assistant Examiner* — Jimin You
(74) *Attorney, Agent, or Firm* — Oliff PLC

(57) ABSTRACT

A vehicle control apparatus includes: a transmission unit transmitting information to a control apparatus of an infrastructure in a non-contact manner, the information being on a vehicle driven by power supplied from a battery, which is rechargeable and is supplied with energy from the infrastructure of an outside in a non-contact manner; and a control unit acquiring information on a platoon of the vehicle from the outside by communication and causing the vehicle to travel according to the information on the platoon of the vehicle acquired.

4 Claims, 6 Drawing Sheets

VEHICLE CONTROL APPARATUS, DRIVING SUPPORT APPARATUS, AND CONTROL APPARATUS OF INFRASTRUCTURE

CROSS-REFERENCE TO RELATED APPLICATION(S)

The present application claims priority to and incorporates by reference the entire contents of Japanese Patent Application No. 2018-197726 filed in Japan on Oct. 19, 2018.

BACKGROUND

The present disclosure relates to a vehicle control apparatus, a driving support apparatus, a control apparatus of an infrastructure, a vehicle driving control system, a driving control method, and a recording medium.

There has been known a technique of forming a vehicle group between a plurality of vehicles by intervehicle communication (see, for example, Japanese Laid-open Patent Publication No. 2015-022423).

SUMMARY

There is a need for providing a vehicle control apparatus, a driving support apparatus, a control apparatus of an infrastructure, a vehicle driving control system, a driving control method, and a recording medium, which enable appropriate platoon travel while reducing a communication load between vehicles.

According to an embodiment, a vehicle control apparatus includes: a transmission unit transmitting information to a control apparatus of an infrastructure in a non-contact manner, the information being on a vehicle driven by power supplied from a battery, which is rechargeable and is supplied with energy from the infrastructure of an outside in a non-contact manner; and a control unit acquiring information on a platoon of the vehicle from the outside by communication and causing the vehicle to travel according to the information on the platoon of the vehicle acquired.

Further, according to an embodiment, the driving support apparatus includes: a reception unit receiving information on a vehicle, the information being acquired from a control apparatus of an infrastructure, which supplies energy to the vehicle, and being acquired from a vehicle control apparatus, which controls the vehicle when the infrastructure supplies the energy; a platoon information creation unit creating, based on the information on the vehicle, information on a platoon of a plurality of vehicles including the vehicle; and a transmission unit transmitting the information on the platoon created to the vehicle control apparatus.

Further, according to an embodiment, a control apparatus of an infrastructure, the infrastructure supplying energy to a vehicle control apparatus, which controls a vehicle including a battery, which is rechargeable, includes: a supply unit causing the infrastructure to supply the energy to the vehicle in a non-contact manner with the vehicle; and a transmission unit acquiring information on the vehicle from the vehicle via the infrastructure to transmit the information on the vehicle to a driving support apparatus, which creates platoon information on the vehicle.

Further, according to an embodiment a vehicle driving control system includes: a vehicle control apparatus, which is provided in a vehicle driven by power supplied from a battery, which is rechargeable, and controlling the vehicle; a control apparatus of an infrastructure supplying energy to the battery; and a driving support apparatus being capable of communicating with both the vehicle control apparatus and the control apparatus of the infrastructure. Further, the vehicle control apparatus includes: a first transmission unit transmitting information to the control apparatus of the infrastructure in a non-contact manner, the information being on the vehicle driven by the power supplied from the battery, which is rechargeable and is supplied with the energy from the infrastructure of an outside in a non-contact manner; and a control unit acquiring information on a platoon of the vehicle from the outside by communication and causing the vehicle to travel according to the information on the platoon of the vehicle acquired, the control apparatus of the infrastructure includes: a supply unit causing the infrastructure to supply the energy to the vehicle in a non-contact manner with the vehicle; and a second transmission unit acquiring information on the vehicle from the vehicle via the infrastructure to transmit the information on the vehicle to the driving support apparatus, and the driving support apparatus includes: a reception unit receiving information on the vehicle, the information being acquired from a vehicle control apparatus, which controls the vehicle when the infrastructure supplies the energy; a platoon information creation unit creating, based on the information on the vehicle, information on a platoon of a plurality of vehicles including the vehicle; and a third transmission unit transmitting the information on the platoon created to the vehicle control apparatus.

Further, according to an embodiment, a driving control method by a driving control system including a vehicle control apparatus, which is provided in a vehicle driven by power supplied from a battery, which is rechargeable, and controls the vehicle, a control apparatus of an infrastructure, which supplies energy to the vehicle, and a driving support apparatus, which is capable of communicating with both the vehicle control apparatus and the control apparatus of the infrastructure, includes: acquiring information on the vehicle, the information being acquired from the infrastructure, which supplies the energy to the vehicle, and being acquired from the vehicle when the infrastructure supplies the energy; reading out, from a memory, the information on the vehicle acquired and creating information on a platoon of a plurality of vehicles including the vehicle; and transmitting the information on the platoon created to the vehicle control apparatus.

Further, according to an embodiment a non-transitory computer readable recording medium stores a driving control program which is executed by a driving support apparatus of a driving control system, which includes a vehicle control apparatus, which is provided in a vehicle driven by power supplied from a battery, which is rechargeable, to control the vehicle, a control apparatus of an infrastructure, which supplies energy to the vehicle, and the driving support apparatus, which is capable of communicating with both the vehicle control apparatus and the control apparatus of the infrastructure. Further, the driving control program acquires information on the vehicle, the information being acquired from the infrastructure, which supplies the energy to the vehicle, and being acquired from the vehicle when the infrastructure supplies the energy, creates information on a platoon of a plurality of vehicles including the vehicle based on the information on the vehicle acquired, and transmits the information on the platoon created to the vehicle control apparatus.

DETAILED DESCRIPTION OF THE PREFERRED EMBODIMENTS

In recent years, adoption of an infrastructure, which includes a power feeding lane capable of feeding electric power to a vehicle in a non-contact manner during traveling, has been discussed. For example, an exclusive self-driving road is provided with a power feeding lane that supplies electric power to a vehicle and a non-power feeding lane that does not feed electric power to a vehicle, and each vehicle in a platoon is controlled to feed electric power to a target vehicle. However, when intervehicle communication is performed as in Japanese Laid-open Patent Publication No. 2015-022423, a load on communication, such as information on vehicles and information on a platoon and power feeding, is large, and it takes time to process the information. As a result, there has been a case where necessary information could not have been processed while the vehicles are traveling, and an appropriate platoon could not have been formed to travel.

Hereinafter, one embodiment of the present disclosure will be described with reference to the accompanied drawings. Note that the same or corresponding parts are denoted by the same reference signs in all the drawings of the following embodiment. Moreover, the present disclosure is not limited by the embodiment described below.

Embodiment

Figure 1:
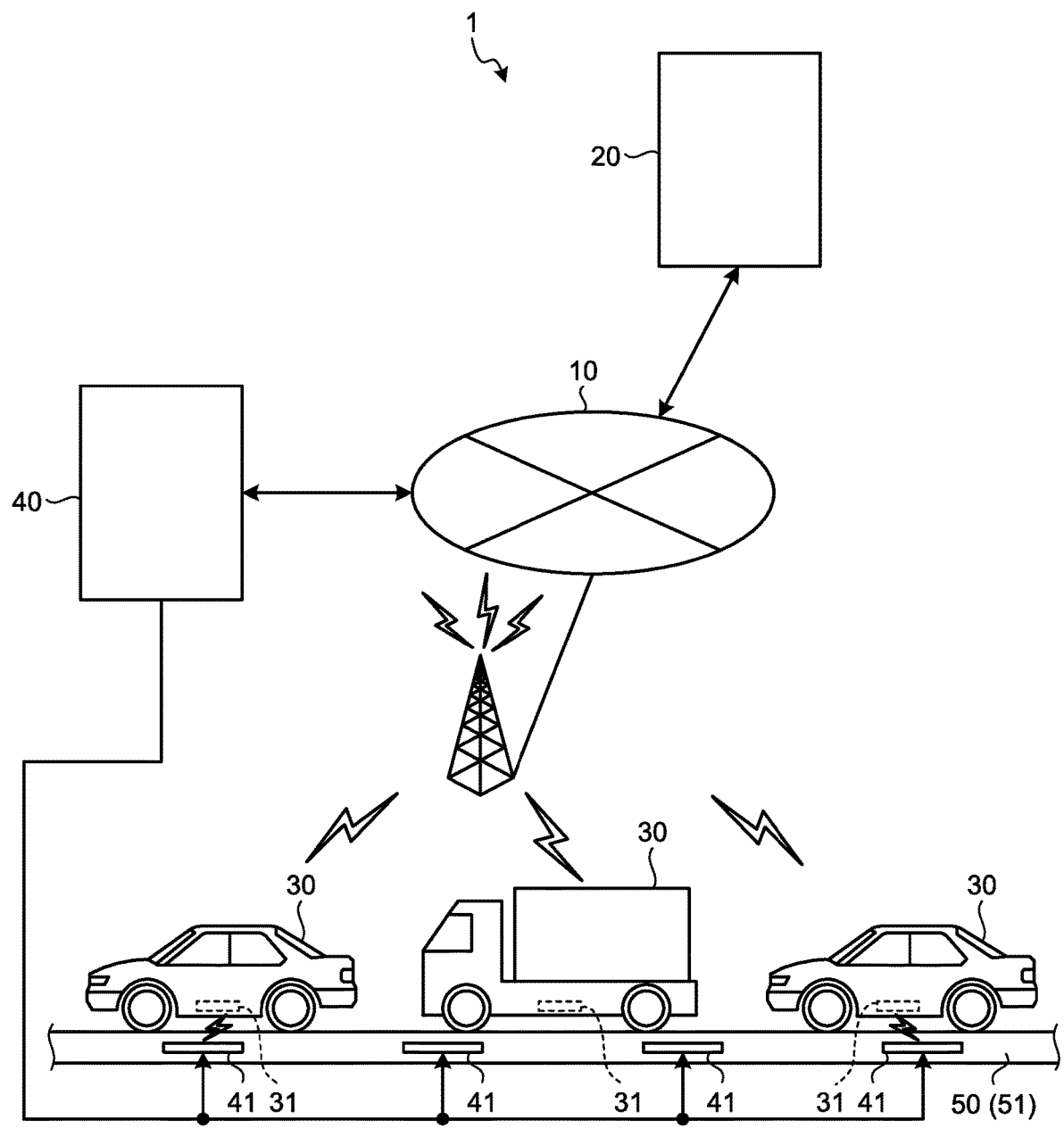
FIG. 1 is a schematic diagram illustrating a vehicle driving control system provided with a driving support apparatus according to one embodiment of the present disclosure.
Figure 2:
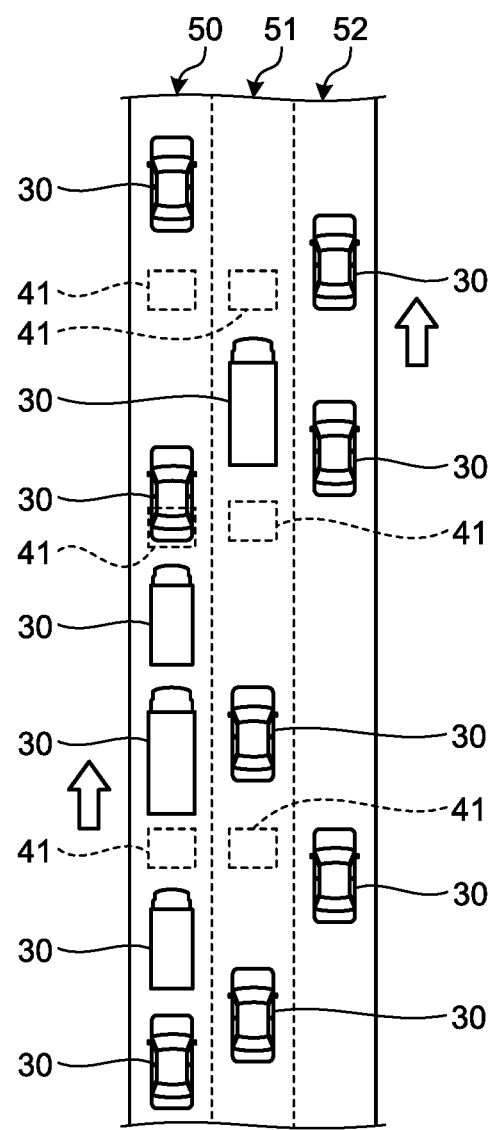
FIG. 2 is a diagram illustrating one example of vehicles and a road in the vehicle driving control system provided with the driving support apparatus according to one embodiment of the present disclosure.
Figure 3:
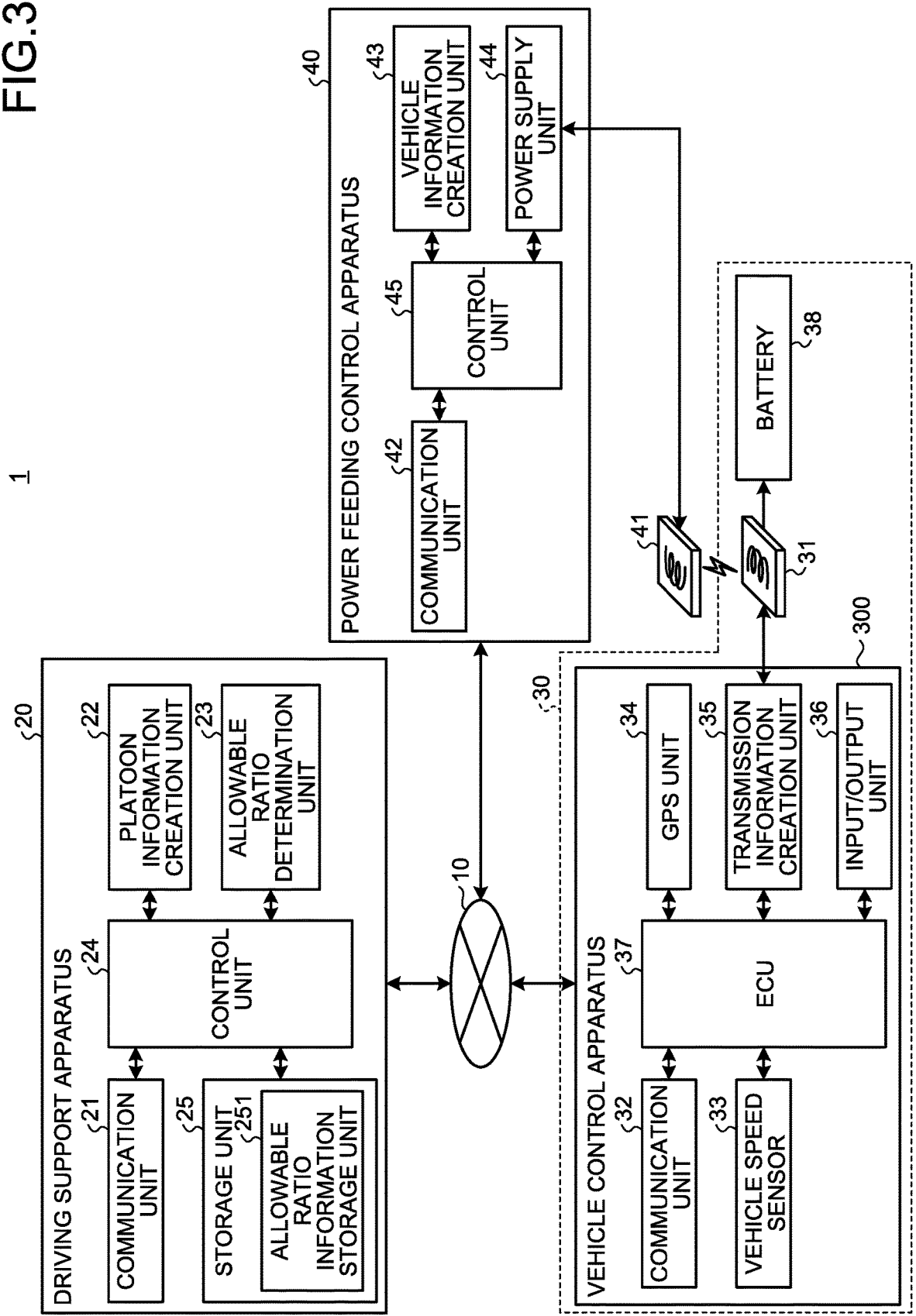
FIG. 3 is a block diagram illustrating a configurations of the driving support apparatus, a vehicle control apparatus, and a power feeding control apparatus provided in the vehicle driving control system according to one embodiment of the present disclosure.

First, a vehicle driving control system provided with a driving support apparatus according to one embodiment of the present disclosure will be described. FIG. 1 is a schematic diagram illustrating the vehicle driving control system according to one embodiment of the present disclosure. FIG. 2 is a diagram illustrating one example of vehicles and a road in the vehicle driving control system provided with the driving support apparatus according to one embodiment of the present disclosure. FIG. 3 is a block diagram illustrating a configurations of the driving support apparatus, a vehicle control apparatus, and a power feeding control apparatus provided in the vehicle driving control system according to one embodiment of the present disclosure.

As illustrated in FIG. 1, a vehicle driving control system 1 according to an embodiment includes a driving support apparatus 20, vehicles 30, and a power feeding control apparatus 40. In the vehicle driving control system 1 according to the embodiment, the driving support apparatus 20, each vehicle 30, and the power feeding control apparatus 40 are communicably connected to each other by a network 10. The network 10 is constituted by the Internet connection network, a mobile phone network or the like which enables communication among the driving support apparatus 20, the vehicles 30, and the power feeding control apparatus 40. In this embodiment, the vehicles 30 are vehicle capable of traveling in the hybrid traveling mode or the Electric Vehicle (EV) traveling mode.

In this embodiment, when a transmission/reception unit 31 provided in each of the vehicles 30 communicates with a power feeding apparatus 41 connected to the power feeding control apparatus 40, power feeding signals are supplied to the vehicles 30, and information on the vehicles 30 is transmitted to the power feeding control apparatus 40.

The transmission/reception units 31 and the power feeding apparatuses 41 are each constituted by using a coil, a switching circuit, and a rectifying/smoothing circuit and transmit and receive signals by a magnetic field resonance method. Thus, the vehicles 30 and the power feeding apparatuses 41 communicate in a non-contact state. Note that examples of power feeding and information transmission utilizing electromagnetic waves are described in this embodiment, but the configuration may be of power feeding/information transmission utilizing light.

The power feeding apparatuses 41 are an infrastructure electrically connected to the power feeding apparatuses 41 provided in a lane that feeds electric power to the vehicles 30 among a plurality of lanes on which the vehicles travel. In this embodiment, among three lanes (lanes 50 to 52 illustrated in FIG. 2), two lanes (lanes 50 and 51) are power feeding lanes (power feeding traffic lanes) that feed electric power to the vehicles 30, and the other lane (lane 52) is a non-power feeding lane (non-power feeding traffic lane) that does not feed electric power to the vehicles 30. The plurality of power feeding apparatuses 41 are provided at preset intervals in the power feeding lanes. The power feeding apparatuses 41 are provided, for example, at intervals of several kilometers in a section of several tens of kilometers. This section is a power feeding section in the power feeding lanes. A road having a power feeding lane and a non-power feeding lane is, for example, an exclusive road (a dedicated road) having predetermined gates to be passed for entry and exit. On this exclusive road, traveling of each vehicle 30 is controlled by self-driving.

The driving support apparatus 20 receives information on each vehicle 30 from the power feeding control apparatus 40 and controls a platoon of vehicles based on the received information. The driving support apparatus 20 may further execute safety confirmation processing in the vehicles 30.

As illustrated in FIG. 3, the driving support apparatus 20 includes a communication unit 21, a platoon information creation unit 22, an allowable ratio determination unit 23, a control unit 24, and a storage unit 25. The driving support apparatus 20 is constituted by using one or a plurality of computers and the like including a central processing unit (CPU), a field programmable gate array (FPGA), a read only memory (ROM), a random access memory (RAM) and the like.

The communication unit 21 is connected to the network 10 to communicate with the vehicles 30 and the power feeding control apparatus 40. The communication unit 21 is constituted by a reception unit that receives information on the vehicles 30 from the power feeding control apparatus 40 and a transmission unit that transmits instruction information related to self-driving to a transmission target vehicle 30. Note that the instruction information related to self-driving is information for the vehicle 30 on the traveling lane (traveling position), at intervals between the vehicles 30 or the like to form a platoon to travel or for removing the vehicle 30 from the platoon to move to a different lane or platoon. Moreover, the reception unit and the transmission unit may be provided separately, not integrally.

The platoon information creation unit 22 creates platoon information on the platoon of the vehicles 30. The platoon information creation unit 22 creates information that controls the platoon of the vehicles 30 based on the number of vehicles traveling in the power feeding section and the allowable ratio in the power feeding lane. Herein, the allowable ratio is a numerical value used to determine whether the allowable ratio determination unit 23 described later allows the traveling of the vehicle 30, and is the number or the total weight of vehicles that can travel in the corresponding power feeding lane.

The platoon information creation unit 22 creates a tentative platoon, for example, by arranging the vehicles 30 currently traveling on the exclusive road in the power feeding lane so as to be in a safe permutation.

Herein, the safe permutation is, for example, a permutation in which a vehicle with a small amount of momentum is not disposed between vehicles with a large amount of momentum. The vehicle with a large amount of momentum is a bus, a truck or the like, and the vehicle with a small amount of momentum is a light automobile. Specifically, vehicles with smaller mass are arranged in order, and vehicles with smaller mass are arranged again toward the rear. At this time, measures may be taken to dispose a vehicle carrying dangerous materials such as gasoline at the rear end or the like.

Moreover, a plurality of vehicle that travel as one group or vehicles that carry dangerous materials (e.g., low explosives, ammunition, radioactive materials and the like) that may cause serious damage to the infrastructure of the road are disposed in the middle of the platoon. Furthermore, before and after that, vehicles with smaller mass may be arranged.

In addition, measures may be taken to dispose a vehicle on which a person requiring to be guarded, such as a state guest, rides, in the middle of the platoon or the like.

The platoon information creation unit 22 selects the vehicles 30 which travels in the power feeding section and creates a platoon based on the results that the allowable ratio determination unit 23 has determined whether the allowable ratio is exceeded by the tentative platoon. When it is determined that the allowable ratio is exceeded by the tentative platoon, the platoon information creation unit 22 creates, according to a predetermined rule, platoon information on a vehicle 30 in the tentative platoon, which has been disposed in the power feeding lane, has relatively low priority, and has been removed from the platoon to be re-disposed in the non-power feeding lane.

The predetermined rule is, for example, at least one of preferentially disposing an emergency vehicle, a commodity distribution vehicle, a disaster recovery assistance vehicle and the like in the power feeding lane or preferentially disposing vehicles with high public interest and vehicles with a relatively small emission amount of an environmental pollutant in the power feeding lane. The emergency vehicles include vehicles that are threatened with the crisis of life, vehicles that are threatened with the economic crisis and the like. A rule, in which a vehicle on which a user who has not paid a special toll for a peak period rides or a vehicle being requested to be stopped by an official organization such as police or public security is disposed in the non-power feeding lane or the like may be added.

For example, the platoon information creation unit 22 creates platoon information in the power feeding section based on the information on the vehicles 30 received up to that time at preset time intervals. Note that the platoon information creation unit 22 may form a platoon in consideration of the power charged amounts of the batteries of the vehicles 30 currently traveling in the power feeding section.

The allowable ratio determination unit 23 calculates the ratio of the vehicles 30 traveling in the tentative platoon in the power feeding lane, determines, based on this ratio, whether or not the allowable ratio is exceeded when each vehicle 30 currently traveling in the power feeding lane is fed with electric power, and outputs the result to the platoon information creation unit 22. The allowable ratio is preset and stored in the storage unit 25. The allowable ratio is, for example, the total number or the total weight of vehicles 30 that can travel in the power feeding section, and is set according to an item (the total number or the total weight) used by the allowable ratio determination unit 23 to calculate the ratio.

The control unit 24 centrally controls the operation of each unit of the driving support apparatus 20.

The storage unit 25 is constituted by using a computer readable recording medium and stores various programs and various data in a writable and readable manner. The storage unit 25 is constituted by having a storage medium, such as an optical disk, a flash memory, or a magnetic disk, as this recording medium, and a drive device of this storage medium.

The storage unit 25 has an allowable ratio information storage unit 251. The allowable ratio information storage unit 251 stores information on the power feeding section in the power feeding lane of the exclusive road, the power feeding characteristics by the power feeding apparatuses 41, an amount of electric power required to feed the vehicles 30, the allowable ratio (the total number or the total weight) in the power feeding section of the power feeding lane and the like. The allowable ratio information storage unit 251 may store information on the amount of electric power required to feed each type of the vehicles 30.

As illustrated in FIG. 3, the vehicle 30 includes the above-described transmission/reception unit 31, a communication unit 32, a vehicle speed sensor 33, a global positioning system (GPS) unit 34, a transmission information creation unit 35, an input/output unit 36, and an electronic control unit (ECU) 37. Moreover, the vehicle 30 is provided with a battery 38 that supplies electric power to each unit. This battery 38 is configured to be rechargeable.

In this embodiment, the transmission information creation unit 35 and the ECU 37 constitute a vehicle control apparatus 300. The vehicle control apparatus 300 is constituted by using one or a plurality of computers and the like including a CPU, an FPGA, a ROM, a RAM and the like.

As described above, the transmission/reception unit 31 receives the power feeding signal from the power feeding apparatus 41 as well as transmits its own vehicle information. The transmission/reception unit 31 corresponds to an acquisition unit tha-t acquires energy from the infrastructure (the power feeding apparatus 41) and a transmission unit that transmits its own information to the infrastructure by electromagnetic waves. Note that the acquisition unit that acquires energy from the infrastructure and the transmission unit that transmits its own information to the infrastructure may be provided separately, not integrally.

The communication unit 32 communicates with the driving support apparatus 20 by wireless communication via the network 10. The communication unit 32 receives, from the driving support apparatus 20, driving support information that supports the driving of the vehicle 30. Note that the driving support information includes platoon information for the vehicle 30 on the traveling lane, of that speed or the like to form a platoon to travel or for removing the vehicle 30 from the platoon to move to a different lane or platoon.

The vehicle speed sensor 33 detects the speed (vehicle speed) of the vehicle 30 and outputs an electric signal indicating the detected vehicle speed to the ECU 37. The electric signal indicating the vehicle speed is output to the outside (the driving support apparatus 20) or stored in a storage unit (not illustrated).

The GPS unit 34 receives radio waves from the GPS satellites and detects the position of the vehicle 30. The detected position is output to the outside (the driving support apparatus 20) or stored in a storage unit (not illustrated) as positional information on the vehicle 30.

The transmission information creation unit 35 creates transmission information transmitted to the power feeding control apparatus 40. This transmission information includes the model of the vehicle, an occupant, mass, the remaining level of the battery 38, the positional information on the vehicle 30 and the like. The number of occupants can be detected by using, for example, a seating sensor. The transmission information creation unit 35 outputs the created transmission information to the transmission/reception unit 31. The transmission/reception unit 31 transmits the transmission information to the power feeding control apparatus 40 via the power feeding apparatus 41.

Moreover, the power feeding signal received by the transmission/reception unit 31 is supplied to the battery 38 as the electric power.

Furthermore, the input/output unit 36 is constituted by a touch panel display, a speaker and the like. The input/output unit 36 is configured to be capable of inputting and outputting predetermined information, such as information on the driving support by displaying characters, figures and the like on the screen of the touch panel display and outputting sound from the speaker according to the control of the ECU 37. Further, the input/output unit 36 is configured to be capable of inputting predetermined information into the ECU 37 by manipulating the touch panel display and speaking to a speaker by the user or the like of the vehicle 30.

The ECU 37 is constituted by an information processing apparatus such as a microcomputer including a CPU, an FPGA, a ROM, a RAM and the like. The ECU 37 centrally controls the electric operation of each unit of the vehicle 30. The ECU 37 is configured to perform an arithmetic operation by using input data, data stored in advance, and a program and output the result of the arithmetic operation as a control command signal. For example, when received information on traveling (platoon information described later) from the driving support apparatus 20, the ECU 37 causes the vehicle 30 to travel according to this information.

For example, the ECU 37 causes the vehicle 30 to travel at a designated speed in a designated lane.

Note that, although not illustrated, the vehicle 30 includes a storage unit, which includes a storage medium, such as a hard disk or a semiconductor memory, and a drive device for this storage medium, and a sensor that detects an object approaching the forward side. The storage unit stores an operating system (OS) and programs of various applications necessary for the ECU 37 to centrally control the work of each unit of the vehicle 30.

Moreover, the vehicle 30 includes a control mechanism and a manipulation mechanism for driving the vehicle 30. Specifically, the vehicle 30 includes a powertrain and driving wheels as a driving mechanism. The powertrain includes a power source, which generates a driving force and outputs the driving force from an output shaft, and a power transmission mechanism that transmits the driving force output by the power source to a driving wheel 2.

Furthermore, the manipulation mechanism is constituted by a shift lever, an accelerator pedal and the like.

Note that each unit is driven according to the instruction signal under the control of the ECU 37 when self-driving of the vehicle 30 is performed.

The power feeding control apparatus 40 is connected to the above-described power feeding apparatus 41, receives the information acquired by the power feeding apparatus 41 from each vehicle 30, and controls the platoon of the vehicles based on the received information. The power feeding control apparatus 40 is constituted by using one or a plurality of computers and the like including a CPU, an FPGA, a ROM, a RAM and the like. The power feeding apparatus 41 outputs the acquired transmission information to the power feeding control apparatus 40 (a control unit 45 described later). The power feeding apparatus 41 is constituted by a supply unit that transmits the power feeding signal to the transmission/reception unit 31 to supply energy, and a reception unit that receives information on the vehicle 30 from the transmission/reception unit 31. Note that the supply unit and the reception unit may be provided separately, not integrally.

Further, the power feeding control apparatus 40 includes a communication unit 42, a vehicle information creation unit 43, a power supply unit 44, and the control unit 45.

The communication unit 42 is connected to the network 10 to communicate with the driving support apparatus 20. The communication unit 42 transmits information on the vehicle 30 acquired from the vehicle 30 to the driving support apparatus 20 and receives various information from the driving support apparatus 20.

The vehicle information creation unit 43 creates vehicle information based on the transmission information on the vehicle 30 acquired by communicating with the transmission/reception unit 31. The vehicle information includes the model of the vehicle, an occupant, mass, the remaining level of the battery 38, the positional information on the vehicle 30 and the like.

The power supply unit 44 supplies electric power to each unit of the power feeding control apparatus 40 as well as supplies electric power to the power feeding apparatus 41.

The control unit 45 centrally controls the operation of each unit of the power feeding control apparatus 40.

Figure 4:
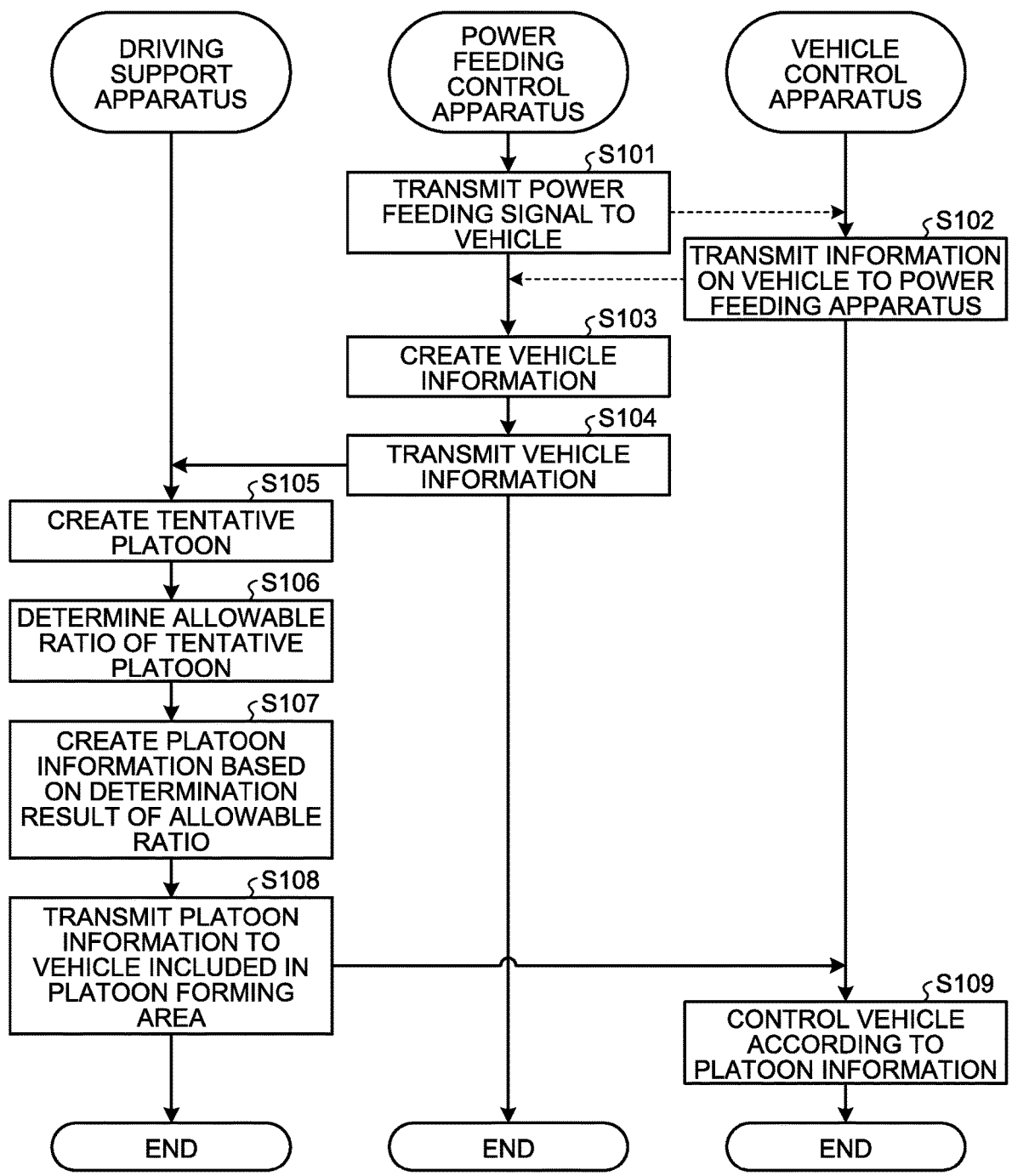
FIG. 4 is a flowchart for explaining driving support processings performed by the vehicle driving control system according to one embodiment of the present disclosure.

Subsequently, the driving support processings performed by the vehicle driving control system 1 will be described with reference to FIG. 4. FIG. 4 is a flowchart for explaining the driving support processings performed by the vehicle driving control system according to one embodiment of the present disclosure. The flowchart illustrated in FIG. 4 is started, for example, after the vehicle 30 enters the exclusive road having the power feeding lane and the non-power feeding lane.

When the vehicle 30 enters the exclusive road and passes over the power feeding apparatus 41, the power feeding signal is supplied to the vehicle 30 from the power feeding control apparatus 40 via the power feeding apparatus 41 and the transmission/reception unit 31 (Step S101). By receiving the power feeding signal, electric power is supplied to the battery 38 of the vehicle 30.

Moreover, when passed over the power feeding apparatus 41, the vehicle control apparatus 300 transmits the transmission information on the vehicle 30 to the power feeding apparatus 41 (the power feeding control apparatus 40) via the transmission/reception unit 31 (Step S102). As described above, the transmission information includes the model of the vehicle, an occupant, mass, the remaining level of the battery 38, the positional information on the vehicle 30 and the like.

Note that the order of Steps S101 and S102 described above may be reversed.

When received the transmission information on the vehicle 30, the vehicle information creation unit 43 creates the vehicle information on the vehicle 30 (Step S103). As described above, the vehicle information includes at least information necessary for the processings of the driving support apparatus from among the model of the vehicle, an occupant, mass, the remaining level of the battery 38, the positional information on the vehicle 30 and the like. The vehicle information creation unit 43 transmits the created vehicle information to the driving support apparatus 20 (Step S104).

When the driving support apparatus 20 has received the vehicle information, the platoon information creation unit 22 creates the platoon information on the vehicles 30 in the power feeding lane and the non-power feeding lane (Steps S105 to S107).

In Step S105, the platoon information creation unit 22 creates the tentative platoon such that the vehicles 30 are in a safe permutation.

In Step S106 following Step S105, the allowable ratio determination unit 23 determines whether the ratio of the vehicles 30 in the tentative platoon in the power feeding lane exceeds the allowable ratio (Step S106). The allowable ratio determination unit 23 outputs the determination result to the platoon information creation unit 22.

Thereafter, the platoon information creation unit 22 creates the platoon information based on the determination result of the allowable ratio determination unit 23 (Step S107). The platoon information creation unit 22 creates the platoon information with the tentative platoon as a main platoon when the tentative platoon does not exceed the allowable ratio. On the other hand, the platoon information creation unit 22 changes the tentative platoon according to the predetermined rule to create the platoon information when the tentative platoon exceeds the allowable ratio.

When the platoon information is created, the driving support apparatus 20 transmits the created platoon information to the vehicles 30 (Step S108). In Step S108, the platoon information is transmitted to all the vehicles 30 belonging to the platoon forming area.

When received the platoon information, the vehicle control apparatus 300 causes the vehicle 30 to travel according to the designated lane and arrangement under the control of the ECU 37 (Step S109). At this time, the rearrangement of the vehicles 30 is performed in a section (other than the power feeding section) where the power feeding apparatuses 41 are not placed in the power feeding lane. Furthermore, the maintenance of each interval between the vehicles 30 and the like after the platoon is formed is controlled by intervehicle communication.

In this embodiment described above, the decision of the platoon in the power feeding lane and the non-power feeding lane is transmitted from the vehicle 30 to the driving support apparatus 20 via the infrastructure (the power feeding control apparatus 40 including the power feeding apparatus 41), and each vehicle 30 in the platoon is controlled by creating the platoon information in the driving support apparatus 20. According to this embodiment, since an appropriate platoon is formed without communication among vehicles, appropriate platoon travel can be realized while a communication load between vehicles is reduced.

MODIFICATION EXAMPLE

Figure 5:
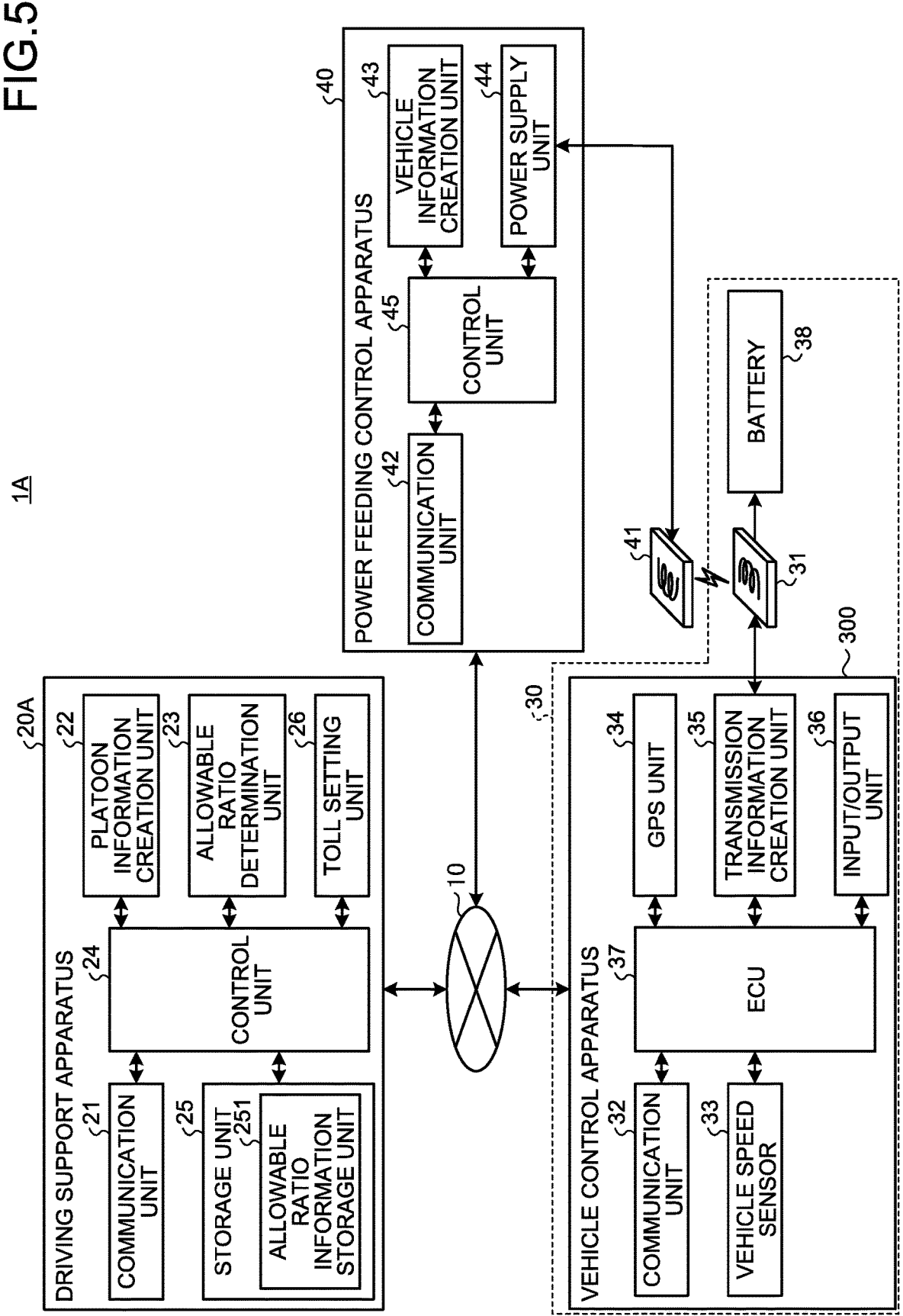
FIG. 5 is a block diagram illustrating a configurations of a driving support apparatus, a vehicle control apparatus, and a power feeding control apparatus provided in a vehicle driving control system according to a modification example of the embodiment of the present disclosure.

FIG. 5 is a block diagram illustrating the configurations of a driving support apparatus, a vehicle control apparatus, and a power feeding control apparatus provided in a vehicle driving control system according to a modification example of the embodiment of the present disclosure. A vehicle driving control system 1A according to the modification example includes a driving support apparatus 20A in place of the above-described driving support apparatus 20. Other than that, the configuration is the same as that of the vehicle driving control system 1 so that the description thereof will be omitted. The driving support apparatus 20A includes a toll setting unit 26 in addition to the configuration of the above-described driving support apparatus 20, and a consideration charged to a user associated with a target vehicle 30 is set based on the information on the vehicle 30 passing the power feeding apparatus 41. This consideration is preset and changed as appropriate depending on the number or the total weight of vehicles traveling in the power feeding lane. In this modification example, an example will be described in which the consideration is a toll (cash), but other considerations such as points or virtual currency may be charged, or the energy supply mode (the magnitude of the supply rate) may be changed for the power supply rate as a consideration. Note that, in this modification example, an example will be described in which the consideration is charged to the vehicle 30 that has communicated with the power feeding apparatuses 41 by traveling in the power feeding lane, but the set consideration may be charged at the time of passing the gate upon the entry into the exclusive road or at the time of passing the gate upon the exit out of the exclusive road.

The toll setting unit 26 sets the toll charged to a vehicle entering the exclusive road based on the ratio of the vehicles occupying the power feeding lane in the platoon created by the platoon information creation unit 22. This ratio indicates a proportion of the vehicles 30 in a preset section, such as, for example, a power feeding section. The toll setting unit 26 sets the toll based on the ratio of the vehicles traveling in the power feeding lane in the platoon created by the platoon information creation unit 22 and a preset toll table. In the toll table, for example, the above-described ratio is associated with the toll, and the larger the ratio, the higher the toll. Note that different tolls may be set for the above-described emergency vehicles and other vehicles. In the toll setting for the ratio, the rate of increase of the toll may be changed between high-priority vehicles, such as emergency vehicles, and other vehicles with relatively low priority. In this case, the rate of increase of the toll charged to the emergency vehicles is lower than the rate of increase of the toll charged to other vehicles. Moreover, in the case where the power supply rate is a consideration, the larger the rate, the smaller the supply rate. The toll setting unit 26 corresponds to a consideration setting unit.

Figure 6:
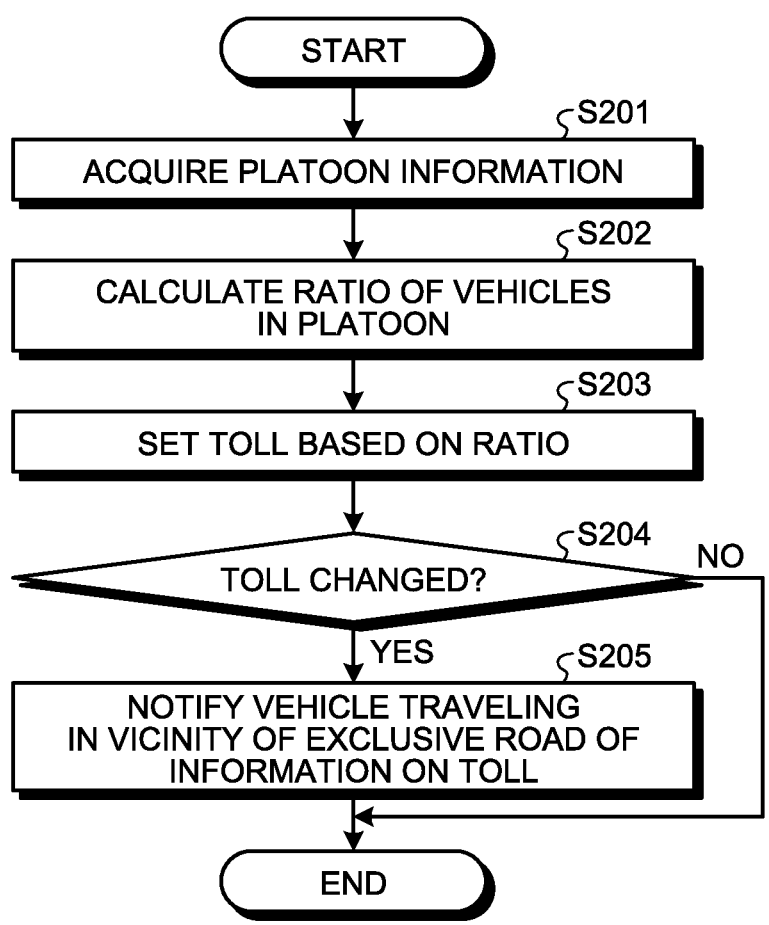
FIG. 6 is a flowchart illustrating compensation structure setting processings performed by the driving support apparatus of the vehicle driving control system according a modified example of the embodiment of the present disclosure.

Subsequently, the driving support processings performed by the vehicle driving control system 1A will be described with reference to FIG. 6. FIG. 6 is a flowchart for explaining consideration system processings performed by the driving support apparatus of the vehicle driving control system according to this modification example. The flowchart illustrated in FIG. 6 is started later by the platoon information creation unit 22.

When the toll setting unit 26 has acquired the platoon information created by the platoon information creation unit 22 (Step S201), the allowable ratio determination unit 23 calculates the ratio of the vehicles 30 traveling in the power feeding lane in this platoon (Step S202).

The toll setting unit 26 sets, based on the calculated ratio and the preset toll table, the toll charged to the user associated with the vehicle entering the exclusive road from now (Step S203). The toll setting unit 26 sets the toll with reference to the ratio and the toll table.

The toll setting unit 26 determines whether the toll set in Step S203 has been changed from the toll immediately before the setting (Step S204). Herein, when the toll setting unit 26 has determined that the toll is not changed (Step S204: No), this consideration system setting processing ends. On the other hand, when the toll setting unit 26 has determined that the toll is changed (Step S204: Yes), the processing proceeds to Step S205.

In Step S205, the control unit 24 notifies the vehicle traveling in the vicinity of the exclusive road of the information on the toll. For example, the notification of the information on the change of the toll is made. The notification may be made to each vehicle 30 individually or may be displayed on a bulletin board provided on the road or the like.

In the modification example described above, as in the above-described embodiment, the decision of the platoon in the power feeding lane and the non-power feeding lane is transmitted from the vehicle 30 to the driving support apparatus 20 via the infrastructure (the power feeding control apparatus 40 including the power feeding apparatus 41), and each vehicle 30 in the platoon is controlled by creating the platoon information in the driving support apparatus 20. According to this embodiment, since an appropriate platoon is formed without communication among vehicles, appropriate platoon travel can be realized while a communication load between vehicles is reduced.

Moreover, in this modification example, the consideration system is varied according to the situation of the vehicles traveling in the power feeding lane so that it is possible to suppress the entry of excessive vehicles 30 and control the traveling of the vehicle 30 more appropriately.

Note that, the example in which the vehicle 30 is controlled by self-driving has been described in the embodiment and the modification example described above, but, for example, on the premise that a driver drives the vehicle 30, the information on the traveling lane and speed may be output to the vehicle 30 to control the traveling of the vehicle 30.

Furthermore, in the embodiment and the modification example described above, according to the situation of the exclusive road, even if the vehicle 30 has currently entered the exclusive road before the vehicle 30 enters the exclusive road, the vehicle 30 may be notified of travel in the non-power feeding lane.

Since information is transmitted from a vehicle to the control apparatus of the infrastructure, the driving support apparatus that has received this information from the control apparatus of the infrastructure creates platoon information on the vehicle, and the vehicle travels according to this platoon information, the vehicle control apparatus, the driving support apparatus, the control apparatus of the infrastructure, the vehicle driving control system, the driving control method, and the driving control program according to the present disclosure can exert the effect that enables appropriate platoon travel while reducing a communication load between vehicles.

According to the above driving support apparatus, it is possible to make a vehicle to be traveled on a power feeding lane a high-priority vehicle, such as an emergency vehicle.

According to the above driving support apparatus, it is possible to suppress vehicles entering an exclusive road and to perform appropriate platoon travel in a power feeding lane.

According to the above driving support apparatus, it is possible to suppress vehicles entering an exclusive road and to perform appropriate platoon travel in a power feeding lane.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving support apparatus comprising:
    a reception unit configured to receive information on a first vehicle, the information being acquired from a control apparatus of an infrastructure, the infrastructure being configured to supply energy to the first vehicle, and the information being acquired from a vehicle control apparatus configured to control the first vehicle when the infrastructure supplies the energy;
    a platoon information creation unit configured to create, based on the information on the first vehicle, information on a platoon of a plurality of vehicles including the first vehicle; and
    a transmission unit configured to transmit the information on the platoon created to the vehicle control apparatus, wherein
    the platoon information creation unit is configured to
        create a tentative platoon according to a preset permutation, and
        create the platoon, in which a second vehicle with lower priority than the first vehicle is removed from the tentative platoon, based on a preset condition when the tentative platoon exceeds a preset allowable ratio.

2. The driving support apparatus according to claim 1, further comprising
    a consideration setting unit configured to set, based on a ratio of the vehicles that form the platoon and occupy a lane, a consideration charged to a user associated with a third vehicle that has entered an exclusive road having the lane.

3. The driving support apparatus according to claim 2,
    wherein the consideration setting unit is configured to increase the consideration as the ratio of the vehicles occupying the lane provided with the infrastructure increases.

4. A control apparatus of an infrastructure, the infrastructure being configured to supply energy to a vehicle control apparatus, the vehicle control apparatus being configured to control a vehicle including a rechargeable battery, the control apparatus of the infrastructure comprising:
- a supply unit configured to cause the infrastructure to supply the energy to the vehicle in a non-contact manner with the vehicle; and
- a transmission unit configured to transmit information regarding the vehicle to a driving support apparatus, the driving support apparatus being (i) external to the vehicle, (ii) configured to acquire the information regarding the vehicle from the vehicle via the infrastructure, and (iii) configured to create platoon information on the vehicle.

* * * * *